(12) United States Patent
Thomas et al.

(10) Patent No.: US 7,767,191 B2
(45) Date of Patent: Aug. 3, 2010

(54) COMBUSTION LOOPING USING COMPOSITE OXYGEN CARRIERS

(75) Inventors: Theodore J. Thomas, Columbus, OH (US); Liang-Shih Fan, Columbus, OH (US); Puneet Gupta, Columbus, OH (US); Luis Gilberto Velazquez-Vargas, Columbus, OH (US)

(73) Assignee: The Ohio State University, Columbus, OH (US)

( * ) Notice: Subject to any disclaimer, the term of this patent is extended or adjusted under 35 U.S.C. 154(b) by 965 days.

(21) Appl. No.: 11/010,648

(22) Filed: Dec. 13, 2004

(65) Prior Publication Data

US 2005/0175533 A1    Aug. 11, 2005

Related U.S. Application Data

(60) Provisional application No. 60/528,589, filed on Dec. 11, 2003.

(51) Int. Cl.
    *C01B 3/08* (2006.01)
(52) U.S. Cl. .................. 423/658; 423/648.1; 423/657
(58) Field of Classification Search ............ 423/651, 423/648.1, 655–658
    See application file for complete search history.

(56) References Cited

U.S. PATENT DOCUMENTS

| | | | | |
|---|---|---|---|---|
| 3,027,238 | A * | 3/1962 | Watkins | 423/654 |
| 3,442,620 | A * | 5/1969 | Schora, Jr. et al. | 423/658 |
| 4,343,624 | A | 8/1982 | Belke et al. | |
| 5,447,024 | A | 9/1995 | Ishida et al. | |
| 5,827,496 | A | 10/1998 | Lyon | |
| 6,007,699 | A | 12/1999 | Cole | |
| 6,509,000 | B1 * | 1/2003 | Choudhary et al. | 423/652 |
| 6,663,681 | B2 | 12/2003 | Kindig et al. | |
| 6,667,022 | B2 | 12/2003 | Cole | |
| 6,669,917 | B2 | 12/2003 | Lyon | |
| 6,682,714 | B2 | 1/2004 | Kindig et al. | |
| 6,685,754 | B2 | 2/2004 | Kindig et al. | |

(Continued)

FOREIGN PATENT DOCUMENTS

EP    1134187 A2    9/2001

(Continued)

OTHER PUBLICATIONS

Mattisson et al., "Applications of Chemical-looping combustion with capture of CO2", Second Nordic minisymposium on carbon dioxide capture and storage, Goteborg, Sweden, Oct. 2001.*

(Continued)

*Primary Examiner*—Jessica L Ward
*Assistant Examiner*—Devang Patel
(74) *Attorney, Agent, or Firm*—Dinsmore & Shohl LLP

(57) ABSTRACT

A method for producing hydrogen gas is provided and comprises reducing a metal oxide in a reduction reaction between a carbon-based fuel and a metal oxide to provide a reduced metal or metal oxide having a lower oxidation state, and oxidizing the reduced metal or metal oxide to produce hydrogen and a metal oxide having a higher oxidation state. The metal or metal oxide is provided in the form of a porous composite of a ceramic material containing the metal or metal oxide. The porous composite may comprise either a monolith, pellets, or particles.

26 Claims, 5 Drawing Sheets

U.S. PATENT DOCUMENTS

| | | | |
|---|---|---|---|
| 6,875,411 | B2 | 4/2005 | Sanfilippo et al. |
| 7,404,942 | B2 | 7/2008 | Sanfilippo et al. |
| 2001/0055559 | A1 | 12/2001 | Sanfilippo et al. |
| 2003/0130360 | A1* | 7/2003 | Kindig et al. ............... 518/703 |
| 2003/0180215 | A1* | 9/2003 | Niu et al. .................... 423/651 |
| 2004/0030214 | A1* | 2/2004 | Schindler et al. ............ 585/660 |
| 2007/0258878 | A1 | 11/2007 | Sanfilippo et al. |

FOREIGN PATENT DOCUMENTS

EP          1445018 A1    8/2004

OTHER PUBLICATIONS

Lyngfelt et al., "Reactivity of metal oxide supported on alumina with alternative methan and oxygen- application CLC", Energy & Fuels, 2003, vol. 17, p. 643-651.*

Jin et al., "Development of a Novel CLC synthesis of a looping material with a double metal oxide of CoO-NiO", Eneergy & Fuels, 1998, vol. 12, p. 1272-1277.*

Mattisson et al., "The use of iron oxide as an oxygen carrier in CLC of methane with inherent separation of CO2", Fuel, vol. 80, 2001, pp. 1953-1962.*

CO2 Capture And Storage In Geological Formations, U.S. Department of Energy, NCCTI Energy Technologies Group, Office of Fossil Energy, 34 pp., Revised Jan. 8, 2002.

Paul Cho, et al., Comparison Of Iron-, Nickel-, Copper- And Manganese-Based Oxygen Carrier For Chemical-Looping Combustion, 2003 Elsevier Ltd., www.sciencedirect.com, Department of Environmental Inorganic Chemistry, pp. 1215-1225, Revised Nov. 25, 2003, Sweden.

Mohammad M. Hossian, et al., Chemical-Looping Combustions (CLC) For Inherent CO2 Separations—A Review, Chemical Engineering Science Journal Homepage: www.elsevier.com, Chemical Engineering Science 63 (2008) pp. 4433-4451, Canada.

Tobias Mattisson, et al., Use of Ores And Industrial Products As Oxygen Carriers In Chemical-Looping Combustion, 2009 American Chemical Society, Energy & Fuels 2009, 23, pp. 2307-2315, Sweden.

Fanxing Li, et al., Clean Coal Conversion Processes—Progress And Challenges, The Royal Society of Chemistry 2008, Energy & Environmental Science, www.rsc.org/ees, Jul. 30, 2008, pp. 248-267, Europe.

Laihong Shen, et al., Chemical-Looping Combustion of Biomass in a 10 kWth Reactor With Iron Oxide As An Oxygen Carrier, Revised Mar. 1, 2009, 2009 American Chemical Society, pp. 2498-2505, USA.

Patrick D.F. Vernon, et al., Partial Oxidation Of Methane To Synthesis Gas, Catalysis Letters 6 (1990), pp. 181-186, J.C. Baltzer A.G. Scientific Publishing Company, Switzerland.

Geological CO2 Sequestration Technology And Cost Analysis, EPA Technical Support Document, Jun. 2008, pp. i-vi & 1-61, United States Environmental Protection Agency, USA.

D. Geldart, Types Of Gas Fluidization, Postgraduate School of Powder Technology, University of Bradford Yorks, G.B., Revised Nov. 1, 1972, Great Britain.

* cited by examiner

Reaction (unbalanced)

$C_xH_y + Fe_2O_3 \Rightarrow CO_2 + H_2O + Fe$

Reaction $3Fe + 4H_2O \Rightarrow Fe_3O_4 + 4H_2$ $2Fe_3O_4 + 1/2 O_2 \Rightarrow 3Fe_2O_3$

COMBUSTION LOOPING USING COMPOSITE OXYGEN CARRIERS

CROSS-REFERENCE TO RELATED APPLICATION

This application claims the benefit of prior-filed U.S. Provisional Patent Application Ser. No. 60/528,589, filed Dec. 11, 2003, the subject matter of which is hereby incorporated by reference in its entirety.

TECHNICAL FIELD OF THE INVENTION

The present invention relates to the use of combustion looping and steam reduction with a metal such as iron to produce hydrogen.

BACKGROUND OF THE INVENTION

To address the many serious problems caused by the use of carbon-based fuels, much attention is now being focused on the use of hydrogen as a non-polluting fuel. It is known that hydrogen gas ($H_2$) can be produced from many different feedstocks such as natural gas, biomass, or water using a number of different techniques such as reformation, water gas shift reaction, gasification, or electrolysis. Several known methods include steam methane reformation (SMR), coal gasification, non-catalytic partial oxidation, biomass gasification and pyrolysis, and water electrolysis.

Steam methane reformation (SMR) has received a good deal of attention because of a belief that it can be used in economical and commercially viable processes. The feedstock is typically natural gas and the process reacts methane ($CH_4$) with steam ($H_2O$) to form a gas stream that includes $H_2$ and CO. The CO is further converted to $CO_2$ using the water gas shift reaction, liberating further $H_2$. The $CO_2$ must be separated from the gas stream to form pure $H_2$.

Hydrogen production from coal gasification is another established technology. In the coal gasification process, steam and oxygen are utilized in a coal gasifier to produce a hydrogen-rich gas. Relatively high purity hydrogen can then be created from the synthesis gas by a water gas shift reaction and removed with separations processes. Other gases such as fuel gases and acid gases must also be separated from the hydrogen. Hydrogen can be similarly formed by the gasification of liquid hydrocarbons such as residual oil.

The manufacture of hydrogen by the reduction of steam using a metal species is also known. For example, U.S. Pat. No. 4,343,624 to Belke et al. discloses a three-stage hydrogen production method and apparatus utilizing a steam oxidation process. In the first stage, a low Btu gas containing $H_2$ and CO is formed from a feedstock such as coal. The low Btu gas is then reacted in a second stage with ferric oxide ($Fe_3O_4$) to form iron (Fe), carbon dioxide ($CO_2$) and steam ($H_2O$) in accordance with the reaction:

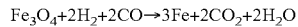
$Fe_3O_4+2H_2+2CO \rightarrow 3Fe+2CO_2+2H_2O$

The steam and iron are then reacted in a third stage to form hydrogen gas by the reaction:

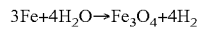
$3Fe+4H_2O \rightarrow Fe_3O_4+4H_2$

The iron oxide is taught by the patentee to be recyclable to the second stage for use in the iron oxide reduction reaction, such as by continuously returning the iron oxide to the second stage reactor via a feed conduit. At least one of the stages takes place in a rotating fluidized bed reactor. However, in actual practice, it is difficult to maintain the redox activity of pure iron oxide over multiple reduction/oxidation cycles. Furthermore, the co-current gas/solid contacting pattern is expected to restrict conversion efficiencies.

U.S. Pat. Nos. 5,827,496, 6,007,699, and 6,667,022 describe a method and apparatus for separating synthesis gas (a gas comprising mainly $H_2$ and CO) and other gaseous fuels into separate streams of wet $H_2$ and $CO/CO_2$ using a mixture of limestone and iron oxide circulating between two fluidized bed reactors. U.S. Pat. No. 6,669,917 describes a similar process using a set of three fluidized beds reactors.

U.S. Pat. Nos. 6,663,681, 6,685,754, and 6,682,714 are all directed to a method of producing $H_2$ gas using low cost carbon feedstocks, including high sulfur coal, and steam. The two-step process injects into a molten metal (Fe) bath reactor. The oxygen in the steam reacts with the iron to form $H_2$ and FeO. In the second step, carbon fuel is inputted, the FeO is reduced to its metallic state, and $CO_2$ is released. However, the process must be carried out at very high temperatures above about 1100°-1300° C. in specially-designed ceramic reactors such as those used in smelting operations. U.S. Pat. No. 5,447,024, teaches a chemical looping combustion method for a power plant that includes reacting a hydrocarbon fuel with a metallic oxide in a first reactor to release gases containing carbon dioxide and water vapor to operate a turbine while reducing a portion of the metal oxide. The reduced metal oxide is reacted in a second reactor where it is oxidized with air, to produce a second gas stream that is also used to operate a turbine. A small amount of steam is added to the air primarily to improve the heat transfer inside the bed, rather than to produce any hydrogen. In one embodiment, the metal oxide is a nickel oxide admixed with yttrium-stabilized zirconium and then sintered at high temperatures to form solid, non-porous particles. It is taught that the particles may be recycled between the two reactors.

However, despite the amount of research taking place, an economically viable process for producing large amounts of relatively pure hydrogen gas remains elusive. Thus, there remains a need in this art for such a process.

SUMMARY OF THE INVENTION

Embodiments of the present invention meet that need by providing a two-stage process that can utilize a number of solid, liquid, or gaseous carbon-based fuels to produce hydrogen gas. In the process, porous composite particles containing a suitable metal oxide provide both large surface area for the redox reactions to take place as well the ability to survive numerous processing cycles. The process provides higher energy conversion efficiency than prior art processes.

In accordance with one aspect of the present invention, a method for producing hydrogen gas is provided and comprises reducing a metal oxide in a reduction reaction between a fuel and a metal oxide to provide a reduced metal or metal oxide having a lower oxidation state, and oxidizing the reduced metal or metal oxide to produce hydrogen and a metal oxide having a higher oxidation state. The metal or metal oxide is provided in the form of a porous composite of a ceramic material containing the metal or metal oxide. That is, after the reduction reaction, metal or a metal oxide having a lower oxidation state will be present in the composite particles, while after oxidation, metal oxide having a higher oxidation state will be present. The porous composite may comprise either a monolith, pellets, or particles.

In one embodiment, the porous composite comprises particles have a size in the range of from about 50 microns to about 1 mm, and in another embodiment, the porous pellets have a size in the range of from about 1 mm to about 50 mm. The metal or metal oxide is present in the porous composite in the form of very small (possibly sub-micron) sized particles. The porous composite preferably comprises a mesoporous matrix in which the pore sizes range from about 20 to about 250 Angstroms.

The ceramic material may be selected from at least one of the group consisting of oxides of Al, Ti, Zr, Y, Si, La, Sr, and carbides of Si and Ti. Preferably, the ceramic material comprises from about 1 to about 85 wt % of the weight of the composite. Preferably, the metal/metal oxide in the composite is selected from the group consisting of at least one of Fe, Cu, Ni, Sn, Co, V, Zn, Mn, and Mo and oxides thereof. In certain embodiments, a reaction promoter or catalyst may be present in the composite material in the form of a metal oxide. Such a promoter or catalyst may be selected from the group consisting of at least one of oxides of Fe, Cu, Ni, Sn, Co, V, Zn, Mo, Pt, Ru, Cr, Mn, and Ca. Preferably, the reaction promoter or catalyst comprises no greater than 25 wt % of the weight of the composite.

In order to simplify the recovery of the composite particles, in preferred embodiments of the invention the metal or metal oxide in the composite has ferromagnetic or eddy current properties. Thus, for example, the composite particles may be separated from inert materials such as ash by magnetic or electrical separation. In this manner, the porous metal oxide/ceramic composite from the oxidation reaction may be recycled and reused in the reduction reaction. Embodiments of the invention are advantageous in that the ceramic composite matrix is robust and survives many reuses. The porosity of the composite material also provides a large surface area for the redox reactions to take place.

In other embodiments, the method optionally includes purifying the hydrogen gas that is formed using a membrane filter to remove impurities and contaminants from the gas. The resultant contaminant stream will contain some hydrogen gas that can be recycled and used as fuel in the reduction reaction stage of the process. Optionally, sulfur and sulfur-containing compounds may also be removed from the hydrogen gas.

The fuel may comprise a solid, liquid, or gaseous, preferably carbon-based fuel. Examples of carbon-based fuels useful in the practice of embodiments of the present invention include coal, oil, oil shale, oil sands, biomass, methane-rich gases, fuel-rich waste gases from fuel cells, separation processes and derivatives and mixtures thereof. If a solid or liquid fuel is used, it may optionally be gasified prior to the reduction reaction using for example, pyrolysis, evaporation, partial oxidation, hydrogenation, carbon dioxide, stream, or a combination of these techniques.

In another embodiment of the invention, a method for producing hydrogen gas is provided and comprises reducing a metal oxide in a reduction reaction between a fuel, oxygen, and a metal oxide to provide a reduced metal or metal oxide having a lower oxidation state, and oxidizing the reduced metal or metal oxide to produce hydrogen and a metal oxide having a higher oxidation state. The metal or metal oxide is provided in the form of a porous composite of a ceramic material containing the metal or metal oxide. As in previous embodiments, the porous composite may comprise a monolith, pellets, or particles having a composition and size range as previously described.

In yet another embodiment of the invention, a method for producing hydrogen gas is provided and comprises reducing a metal oxide in a reduction reaction between a solid fuel and the metal oxide to provide a reduced metal or metal oxide having a lower oxidation state. The metal or metal oxide is provided in the form of a porous composite of a ceramic material, and the reduction reaction takes place in a two-stage moving bed first reactor in which the porous composite particles are supplied to an upper portion of the first stage of the first reactor and the solid fuel is supplied to an upper portion of the second stage of the first reactor. The reduced metal or metal oxide is then oxidized in a second reactor with steam in a countercurrent contacting pattern to produce hydrogen and a metal oxide having a higher oxidation state.

Optionally, the metal oxide is at least partially reduced by exposure to unreacted reducing gases and uncombined volatiles produced by the combustion of the solid fuel in said second stage of said first reactor. The reduction reaction produces a sequestration-ready carbon dioxide gas stream which is removed from the first stage of the first reactor. Optionally, oxygen may be provided to the second stage of the first reactor for combusting the solid fuel.

Preferably, the porous composite particles are removed from the bottom of the second stage of the first reactor and are supplied to an upper portion of the second reactor. In a variation of this embodiment, at least a portion of exhaust gas from the first stage of said first reactor is reintroduced into the second stage of the first reactor. Additionally, at least a portion of any reducing gas that is produced in the second stage of the first reactor may be reintroduced into the lower portion of the second stage of the first reactor.

In still another embodiment, a method for producing hydrogen gas is provided and comprises reducing a metal oxide in a reduction reaction between a liquid fuel and the metal oxide to provide a reduced metal or metal oxide having a lower oxidation state. The metal or metal oxide is provided in the form of a porous composite of a ceramic material containing the metal or metal oxide, with the reduction reaction taking place in a fuel reactor in which the porous composite moves counterflow to the liquid fuel and its gaseous products. The reduced metal or metal oxide is oxidized in a second reactor with steam in a counterflow pattern to produce hydrogen and a metal oxide having a higher oxidation state. The porous composite and the gaseous species may be made to flow counter to one another using a number of reactor designs. For example, the porous composite may be provided in the form of particles or pellets and the fuel reactor/hydrogen production reactor may comprise a rotary kiln, a moving bed of the particles of the porous composite, an interlinked series of fluidized beds with collection of the particles following passage through each bed, or an interlinked series of fixed beds. Alternatively, the porous composite may be provided in the form of a monolithic bed structure and the fuel/hydrogen production reactor will comprise an interlinked series of said monolithic bed structures.

Optionally, the liquid carbon-based fuel may be vaporized prior to combustion in the reduction reaction. For example, the liquid carbon-based fuel may be partially combusted prior to substantially complete combustion in the reduction reaction. Techniques include atomization, pyrolysis, cracking, or hydrogenation.

In still another embodiment, a method for producing hydrogen gas is provided and comprises reducing a metal oxide in a reduction reaction between a gaseous carbon-based fuel and the metal oxide to provide a reduced metal or metal oxide having a lower oxidation state. The metal or metal oxide is provided in the form of a porous composite of a ceramic material containing the metal or metal oxide, and the reduction reaction takes place in a fuel reactor in which the porous composite moves counterflow to the gaseous carbon-based fuel. The reduced metal or metal oxide is oxidized in a second reactor with steam in a counterflow pattern to produce hydrogen and a metal oxide having a higher oxidation state. The fuel reactor and the hydrogen production reactor may comprise a rotary kiln, a moving bed of particles or pellets of the porous composite, an interlinked series of fluidized beds with collection of particles or pellets of the porous composite following passage through each bed, or an interlinked series of fixed beds. Alternatively, the porous composite may be provided in the form of a monolithic bed structure and the fuel reactor/hydrogen production reactor will comprise an interlinked series of the monolithic bed structures.

In another embodiment of the invention an article of manufacture comprising a mesoporous composite of a ceramic material containing a reacting metal or metal oxide is provided. As in previous embodiments, the porous composite may comprise a monolith, pellets, or particles having a composition and size range as previously described.

Embodiments of the invention also provide a method of making the mesoporous composite particles containing a reactive metal or metal oxide using the sol-gel technique that includes providing a ceramic precursor, a metal precursor, and a promoter precursor, mixing the ceramic precursor, metal precursor, and promoter precursor in the presence of a solvent to form a solution, reacting the ceramic precursor, metal precursor, and promoter precursor to form a gel, drying the gel, and calcining the dried gel to form the mesoporous composite.

The ceramic precursor may comprise a metal alkoxide or an inorganic metal salt. The metal precursor may comprise a metal alkoxide, an inorganic metal salt, or an inorganic metal salt hydrate. A promoter or catalyst may be provided and mixed with the ceramic precursor and metal precursor in the form of a metal alkoxide precursor, an inorganic metal salt, or an inorganic metal salt hydrate. Optionally, a surfactant may also be provided. A surfactant will neutralize charges on the gel particles that form and aids in promoting the formation of a mesoporous matrix.

An organic/inorganic acid may also be added to catalyze the reactions between various precursors and to generate high mesoporosity. Other optional additives to the mixture include precipitating agents to induce the formation of the gel. The solution may also be heated to induce formation of the gel. The gel may be dried under ambient conditions, or alternatively supercritical CO2 may be used to extract the solvent and unreacted precursor molecules out of the gel. The gel may also be dried under vacuum or by freeze drying. Following drying, the gel is taken through a series of temperature conditioning steps. First the gel is heated in an inert atmosphere at temperatures in the range of from about 90-130° C., followed by heating in the temperature range of from about 300-400° C. Finally, the gel is calcined in an oxygen atmosphere at 400° C. and above to form the mesoporous composite.

Embodiments of the invention also provide a method of making the mesoporous composite particle containing a reactive metal or metal oxide using a wet impregnation technique that includes the addition of the metal/promoter/catalyst components to the porous solid ceramic material as inorganic salts in solution form, followed by drying, heating, and calcinations as previously described for the sol gel technique. Such a technique is especially valuable when carbides of Si and Ti are desired as the ceramic component of the composite particle.

Accordingly, it is a feature of embodiments of the present invention to provide a process for producing hydrogen gas using redox reactions and a ceramic composite that contains a metal or metal oxide. It is a further feature of embodiments of the present invention to provide a process for the gasification or partial or complete combustion of a carbon-based fuel using a ceramic composite that contains a metal or metal oxide. These and other features and advantages of embodiments of the invention will become apparent from the following detailed description, the accompanying drawings, and the appended claims.

DETAILED DESCRIPTION OF THE PREFERRED EMBODIMENTS

Figure 1:
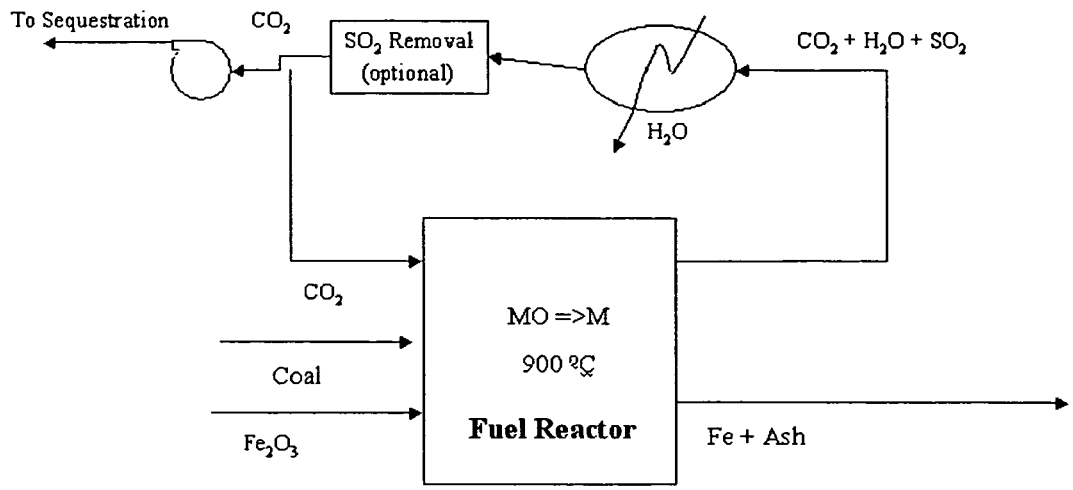
FIGS. 1A and 1B are schematic diagrams of a chemical looping system in accordance with an embodiment of the invention.
Figure 1:
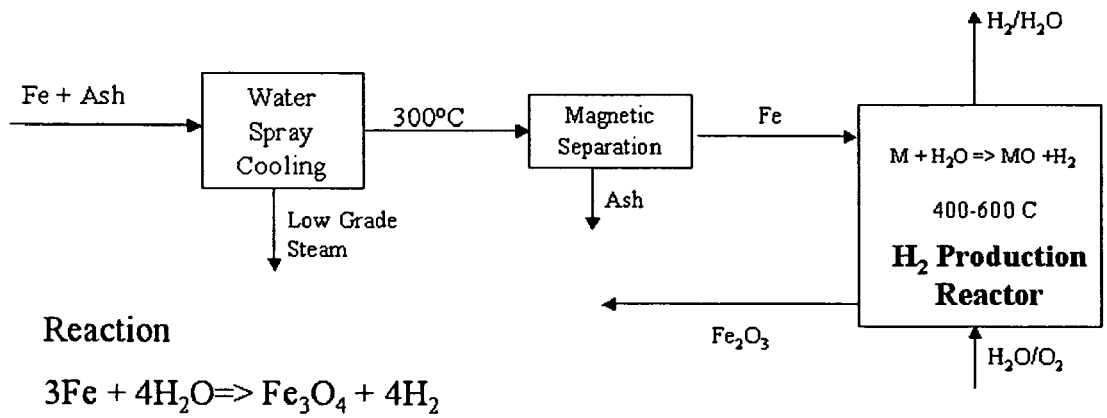

Embodiments of the invention provide systems and methods for using combustion looping with a fuel source, in conjunction with steam reduction using a metal such as for example iron, to produce hydrogen gas. The fuel source can be solid, liquid, or gaseous. Other embodiments of the invention provide an oxygen source, the composite metal oxide particle, for the gasification or partial or complete combustion of carbon-based fuels that results in a separated carbon dioxide-rich flue gas stream. Detailed descriptions of preferred embodiments of the invention follow.

Traditionally the chemical energy stored inside coal has been utilized by combustion with $O_2$ with $CO_2$ and $H_2O$ as products. Similar reactions can be carried out if instead of oxygen, an oxygen carrier is used. Metal oxides such as $Fe_2O_3$ can act as suitable oxygen carriers. However, unlike combustion of fuel with air, there is a relatively pure sequestration ready $CO_2$ stream produced on combustion with metal oxide carriers. The reduced form of metal oxide can then be reacted with air to liberate heat to produce electricity or reacted with steam to form a relatively pure stream of hydrogen, which can then be used for a variety of purposes.

One of the problems with the prior art in combustion looping systems has been the metal/metal oxide oxygen carrier. For example, iron in the form of small particles will degrade and break up in the reactor. Iron oxide has little mechanical strength as well. After only a few redox cycles, the activity and oxygen carrying capacity of the metal/metal oxide drops off considerably. Replacing the oxygen carrier with additional fresh metal/metal oxide makes the process uneconomical.

We have addressed this problem and have provided a robust porous ceramic composite into which the metal/metal oxide oxygen carrier can be placed. Such a composite can be used repeatedly in redox combustion looping reactions with little or no drop in activity or oxygen carrying capacity. Depending on the type of reactor used, the porous ceramic composite may comprise a monolithic structure, pellets, or particles. For example, if a fluidized bed reactor is used, preferably the porous ceramic composite has a particle size of from between about 50 microns to about 1 mm. If a moving bed reactor is used, preferably the porous ceramic composite has a particle size of from between about 1 mm to about 50 mm. If a fixed bed reactor is used, preferably the porous ceramic composite has a particle size of from between about 1 mm to larger monolithic structures. The porous ceramic composite includes smaller metal/metal oxide particles physically entrapped within an open ceramic matrix.

Because of the relatively large sizes of the porous ceramic particles used in certain embodiments of the invention, the particles may be easily separated and recovered from the ash and combustion products of carbon-based fuels using either electrical or magnetic separation techniques. For example, if the metal/metal oxide in the ceramic particles possess ferromagnetic properties, a magnetic field may be used for separation. Alternatively, if the metal/metal oxide in the ceramic particles are electrically conductive, application of an electrical field may be used for eddy current separation.

The ceramic material may be selected from at least one of the group consisting of oxides of Al, Ti, Zr, Y, Si, La, Sr, and carbides of Si and Ti. Preferably, the ceramic material comprises from about 1 to about 85 wt % of the weight of the composite. Preferably, the metal in the composite is selected from the group consisting of at least one of Fe, Cu, Ni, Sn, Co, V, Zn, and Mn. In certain embodiments, a reaction promoter or catalyst may be present in the composite material in the form of an oxide. Such a promoter or catalyst may be selected from the group consisting of at least one of oxides of Fe, Cu, Ni, Sn, Co, V, Zn, Mo, Pt, Ru, Cr, Mn, and Ca. Preferably, the reaction promoter or catalyst comprises no greater than 25 wt % of the weight of the composite.

The mesoporous composite article may be made by the sol gel method which comprises providing a ceramic precursor, metal precursor, and promoter precursor, and mixing the ceramic, metal, and promoter precursors in the presence of a solvent to form a solution. A typical solvent will be, for example, an alcohol such as methanol or ethanol. The ceramic precursor and metal precursor are reacted to form a gel. After drying the gel, the dried gel is calcined to form the mesoporous composite. The ceramic precursor may comprise a metal alkoxide precursor or an inorganic metal salt. For example, titanium isopropoxide may be used as a ceramic precursor. The metal precursor may comprise a metal alkoxide precursor, an inorganic metal salt, or an inorganic metal salt hydrate. For example, the metal precursor may comprise iron chloride. Where one or both of the ceramic and metal precursors is an alkoxide, water may be added to the solution to hydrolyze the alkoxide precursors.

A promoter or catalyst may also be provided and mixed with the ceramic and metal precursor to aid in forming the gel. The promoter or catalyst may comprise a metal alkoxide precursor, an inorganic metal salt, or an inorganic metal salt hydrate. Optionally, a surfactant such as, for example, sodium dodecyl sulfate or sodium lauryl sulfate, may be mixed with the ceramic and metal precursors. A surfactant neutralizes charges on the gel particles that form and aids in promoting the formation of a mesoporous matrix. An organic/inorganic acid, such as, for example, acetic acid or hydrochloric acid, may also be added to catalyze the reactions between various precursors and to generate high mesoporosity.

Other optional additives to the mixture include precipitating agents to induce the formation of the gel. For example, $NH_4OH$ or $NH_4HCO_3$ may used as a precipitating agent. The solution may also be heated to induce formation of the gel. The gel may be dried under ambient conditions, or alternatively, supercritical $CO_2$ may be used to extract the solvent and unreacted precursor molecules from the gel. The gel may also be dried under vacuum or by freeze drying. Following drying, the gel is taken through a series of temperature conditioning steps. First the gel is heated in an inert (e.g., He) atmosphere at temperatures in the range of from about 90-130° C., followed by heating in the temperature range of from about 300-400° C. Finally, the gel is calcined in an oxygen-containing environment at 400° C. and above to form the mesoporous composite.

The molar ratios of components of the composite may vary over wide ranges. For example, the molar ratio of solvent to metal precursor may range from about 0.1:1 to about 30:1. The molar ratio of water (either from hydrates or separately added) to metal oxide precursor may range from about 0.5:1 to about 30:1.

Embodiments of the invention also provide a method of making the mesoporous particle containing a metal or metal oxide using a wet impregnation technique that includes the addition of the metal/promoter/catalyst components to the solid porous ceramic material as inorganic salts such as $FeCl_3$ in solution form, followed by drying, heating, and calcinations as described previously with respect to the sol gel technique. Such a technique is especially valuable when carbides of Si and Ti are desired as the ceramic component of the composite particle.

The method of making the composite results in a matrix which has high mesoporosity. The matrix will contain the reactive species (i.e., the metal/metal oxide) and permit that reactive species to change molar volume during the redox reactions without destroying the matrix or pore structure. Such a capability is unique in that other matrices are designed to contain catalysts, for example, that do not change molar volume.

Embodiments of the present invention make use of a reaction sequence known as chemical looping. Chemical looping is a process by which combustion of a carbon-based fuel occurs in two steps. As shown in FIGS. 1A and 1B, in the first step, a carbon-based fuel such as, for example, coal, is combusted to reduce an oxygen carrier (such as, for example, $Fe_2O_3$). Air or oxygen may optionally be added at this first stage. In embodiments of the present invention, the oxygen carrier is in the form of a porous composite as previously described. In the second step, the oxygen carrier (such as, for example, Fe) is used to oxidize a combustion fuel.

Thus, in the first stage, the oxidation state of the oxygen carrier is lowered. In the example using iron oxide ($Fe_2O_3$), the oxidation state of iron is lowered from +3 to +2.66 ($Fe_3O_4$), +2 (FeO) or 0 (Fe). The first stage reaction may be expressed as:

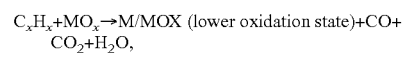

where $C_xH_x$ is the carbon-based fuel, M is the metal, and $MO_x$ is the metal oxide.

As shown in FIG. 1A, carbon dioxide, water vapor and contaminants such as, for example, sulfur dioxide are removed from the reactor. After removal of the water vapor and optional removal of contaminants, the gaseous stream, rich in carbon dioxide, may be sent to a sequestration operation. A portion of the carbon dioxide may be recycled to the reactor. Reduced metal and ash are removed from the first reactor and the metal is separated and recovered (see, FIG. 1B) using magnetic or electrical separation techniques as previously described. The first stage of the reaction is operated at temperatures in the range of from about 400° to about 900° C.

This temperature range is far below the melting point of the metal/metal oxide oxygen carrier or the ceramic composite matrix and is much lower than some prior art processes which are operated at temperatures well in excess of 1100° C. (near the melting or sintering temperatures of several metals and metal oxides).

In the second stage, the metal or metal oxide oxygen carrier is oxidized to have a higher oxidation state. The second stage reaction may be expressed as

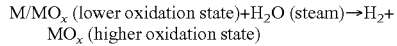

As shown in FIG. 1B, optionally air or oxygen may also be added to the reactor. The oxidation reaction produces a relatively pure stream of wet hydrogen gas which can then be used in a variety of ways as will be explained in greater detail below with respect to specific examples of end uses.

Embodiment Using Solid Carbon-Based Fuel

Figure 2:
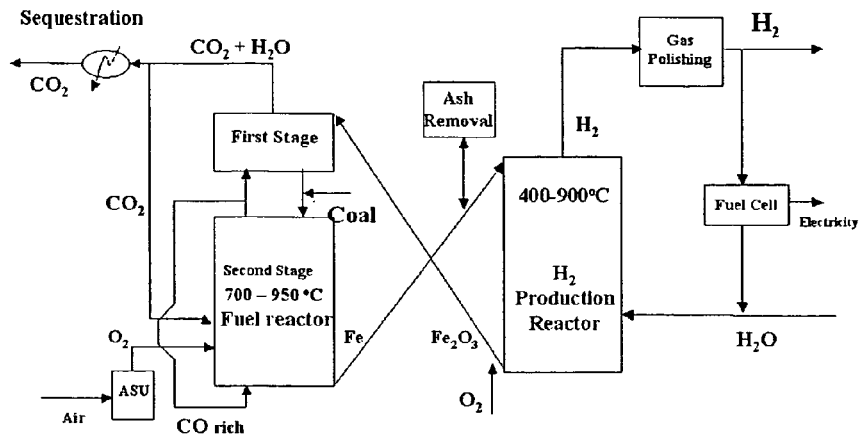
FIG. 2 is a schematic diagram of an embodiment of the invention using a solid carbon-based fuel such as coal.

In this embodiment, and with reference to FIG. 2, a solid fuel such as coal is used as a feedstock. The fuel reactor is a two stage moving bed of solids. In this embodiment, the porous composite comprises iron oxide in a titanium dioxide ceramic matrix. The $Fe_2O_3$—$TiO_2$ composite, in the form of particles/pellets, is introduced at the top of the first stage while coal is introduced at the top of the second stage. Coal devolatilization products react with the $Fe_2O_3$—$TiO_2$ composite particles in the first stage to form a $CO_2$ rich flue gas stream. The char/ash formed flows downward along with partially reduced metal oxide particles as they react to form $CO_2$ and reduced metal. As shown in FIG. 2, this reaction is enhanced by recycling part of the exhaust $CO_2/H_2O$ stream in order to form CO via the Boudard reaction. Part of the CO rich gas produced by the in situ coal gasification is withdrawn and reintroduced at the bottom of the second stage of the fuel reactor. A limited supply of oxygen is supplied to the fuel reactor in order to accomplish better heat integration by limited combustion of coal. The fuel reactor operates at temperatures of between about 700 to about 950°C. The exhaust $CO_2$ stream is cooled to condense the water, resulting in a sequestration ready relatively pure $CO_2$ stream.

The Fe—$TiO_2$ porous composite particles exiting the fuel reactor are separated from the coal ash by magnetic or eddy current separation. These particles are then introduced to the top of the hydrogen production reactor. The hydrogen production reactor is also a moving bed reactor operating at temperatures of from between 400 to about 900° C. High temperature steam, introduced at the bottom of the hydrogen reactor, reacts with the Fe—$TiO_2$ porous composite particles to form hydrogen. The hydrogen that is produced is subjected to a purification step to obtain high purity hydrogen. As an example of an end use for the hydrogen stream, a portion of the clean hydrogen is consumed in a fuel cell to produce electricity while the remainder can be marketed for other purposes. The ratio of the marketable hydrogen to that used for electricity production is dependant upon market demands. The fuel cell exhaust, rich in steam can be recycled to the hydrogen production reactor.

Alternative Embodiment Using Solid Carbon-Based Fuel

Figure 3:
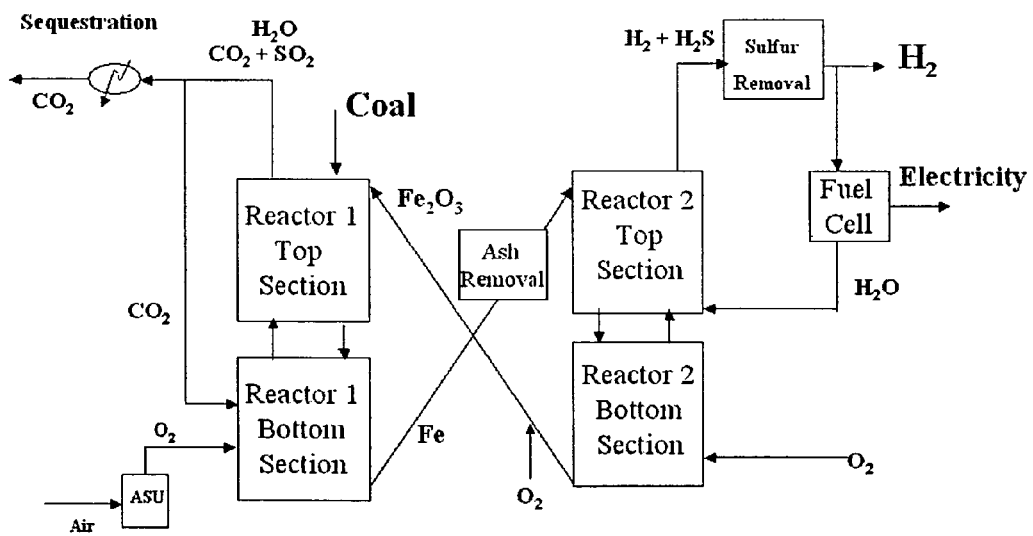
FIG. 3 is a schematic diagram of another embodiment of the invention using a solid carbon-based fuel such as coal.

In this embodiment, coal is again used as the solid carbon-based fuel. The porous composite is $Fe_2O_3$ in a $TiO_2$ ceramic matrix provided in the form of particles. As shown in FIG. 3, the coal and metal oxide porous composite are introduced into the top section of reactor 1. The coal and metal oxide react to form a $CO_2$ rich flue gas stream. Coal devolatilization occurs principally near the top section of reactor 1. The coal volatilization products will react with the metal oxide to form CO2 and H2O. The products produced in the top section of reactor 1 are principally partially reduced metal oxide composite particles and coal char/ash.

The metal oxide composite particles, along with the char/ash exiting the top section of reactor 1 enter the bottom section of reactor 1. Further reduction of the metal oxide will occur by further reaction with the coal and combustion products of coal. The reduction reaction may be enhanced by partially gasifying the coal char in situ using a high temperature $CO_2$ recycle stream. The $CO_2$ will partially gasify the coal char forming CO via the Boudard reaction. The products leaving the bottom section of reactor 1 are principally reduced metal/metal oxide and coal ash.

The reduced metal/metal oxide composite particles are separated from the coal ash using a magnetic or eddy current separator. The separated, reduced metal oxide composite particles are then introduced into the top section of reactor 2. In the top section of reactor 2, hydrogen is produced by a steam-metal oxidation reaction. The metal oxide composite particles then pass into the bottom section of reactor 2. In this section, the metal oxide composite particles are further reacted with oxygen to produce heat. The oxidation reaction products leaving the bottom section of reactor 2 are principally oxidized metal oxide composite particles that are recycled back to reactor 1.

The hydrogen gas produced in reactor 2 is purified, for example, using a hot temperature membrane filter that removes contaminants such as sulfur gases. The purified hydrogen gas can be used, for example, in fuel cells to produce electricity. Reactors 1 and 2 both include top and bottom sections. These sections can either be physically detached or coupled together into a single reactor. The solids (i.e., the porous composite particles) in the reactors move counter-currently with respect to the combustion and other gases. Solids are removed from the bottom of the moving beds and introduced at the top of the beds. The temperatures of operation of the reactors is typically in the range of from about 700° C. to about 950° C. Pressures in the reactors may range from between about 1 to about 30 atm.

Embodiment Using Gaseous Carbon-Based Fuel

Figure 4:
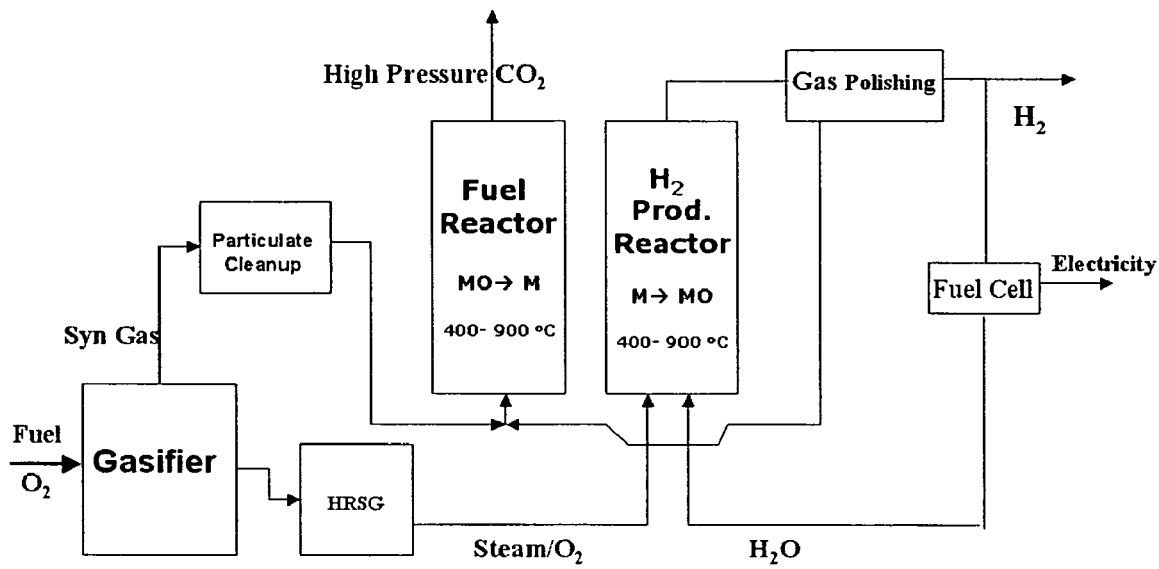
FIG. 4 is a schematic diagram of an embodiment of the invention using a gaseous carbon-based fuel such as synthesis gas.

Particle free synthesis gas from a Texaco® entrained flow oxygen fed gasifier, containing mainly carbon monoxide and hydrogen, is introduced to a fixed bed of $Fe_2O_3$—CuO—$TiO_2$ composite particles in the fuel reactor as shown in FIG. 4. This results in a reducing reaction in which the metal oxide in the composite particles is reduced, producing a $CO_2$ rich flue gas stream. In another similar reactor (Hydrogen production reactor), steam is passed through a bed of reduced Fe—Cu—TiO2 composite particles to oxidize the metal and produce relatively pure hydrogen gas. Both the reactors operate in the temperature range of from about 400° to about 900° C. After the reactions in both reactors are substantially complete, the synthesis gas and steam are interchanged to reverse the reactions in the respective reactors. The process continues in a cyclic manner to provide a continuous supply of hydrogen gas. The use of CuO along with $Fe_2O_3$ in the composite particles provides for easier heat integration in the fuel reactor because the heat of reaction for the two oxides are of opposing nature (i.e., one is endothermic and one is exothermic).

The hydrogen gas that is produced goes through a purification step to obtain high purity hydrogen. A portion of the purified hydrogen stream is consumed in a fuel cell to produce electricity while the remainder of the hydrogen gas can be marketed for other suitable purposes. The ratio of the marketable hydrogen gas to that used for electricity production is dependant upon market demands. The fuel cell exhaust, rich in steam, may be recycled to the hydrogen production reactor. The waste fuel rich stream coming from the hydrogen purification step is recycled back to the fuel reactor to enhance the efficiency of the process.

Embodiment Using Liquid Carbon-Based Fuel

Figure 5:
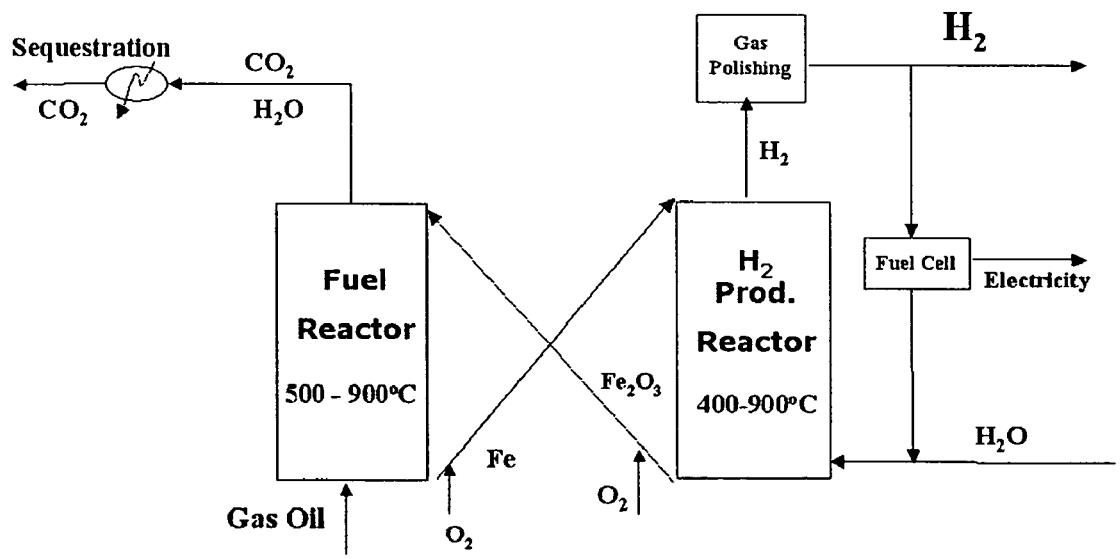
FIG. 5 is a schematic diagram of an embodiment of the invention using a liquid carbon-based fuel.

Gas oil produced in a petroleum refinery is liquid at room temperature. However it is produced at 300-550° C. where it is in a gaseous phase. As shown in FIG. 5, gas oil is contacted with $Fe_2O_3$—$TiO_2$ composite particles in a countercurrent fashion in moving bed reactors to produce hydrogen. The reactions in the fuel reactor cause the formation of reduced metal (Fe) from the metal oxide ($Fe_2O_3$) in the composite particles. The carbon that is formed is combusted using a supply of oxygen/air while the Fe is transported to the hydrogen production reactor. There, the metal is conveyed counter currently with steam to react (oxidize) and produce relatively pure hydrogen gas. The oxidized $Fe_3O_4$—$Fe_2O_3$ mixture is converted substantially completely to $Fe_2O_3$ using oxygen/air and fed back to the fuel reactor for reaction with gas oil vapors. The hydrogen produced is polished (purified) for trace sulfur and CO removal and can be marketed as such or supplied to a fuel cell to produce electricity. The ratio of hydrogen gas to electricity is varied as per market demand.

Embodiment Using Gaseous Carbon-Based Fuel

Figure 6:
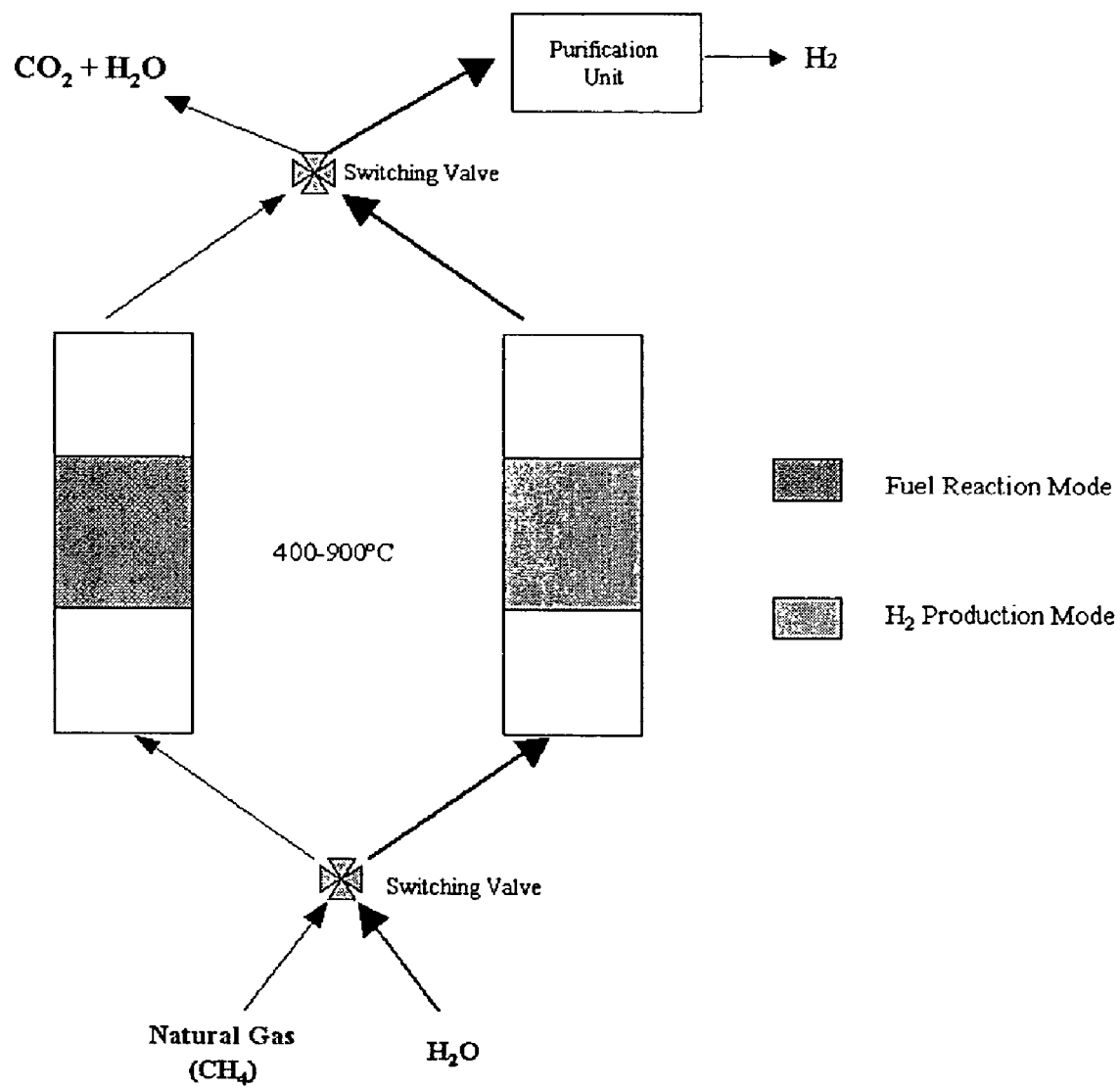
FIG. 6 is a schematic diagram of an embodiment of the invention using a gaseous carbon-based fuel.

This embodiment describes the manufacture of hydrogen gas as a transportation fuel at a service station facility using natural gas as the carbon-based fuel. In this embodiment, reactions as previously described in a gaseous fuel embodiment are utilized. FIG. 6 shows a simplified schematic representation of the system. Natural gas is fed into a fixed bed reactor comprising $Fe_2O_3$—$TiO_2$ porous composite pellets where natural gas (principally methane) is reacted with $Fe_2O_3$ in the composite reducing it to its metal (Fe) state. In another similar reactor, steam is passed over the reduced Fe—$TiO_2$ porous composite pellets to oxidize the metal and produce relatively pure hydrogen gas. When the reactions in both of the reactors are substantially complete, a valve switches the supply of natural gas and steam to the respective reactors, switching their mode of operation. The reactions are performed at temperatures in the range of from about 400° to about 900° C. in each reactor. Multiple reactors, either in fuel reaction mode or the hydrogen production mode, may be employed in order to take advantage of the reaction kinetics or to improve exit gas concentrations. In such a case another reactor supplied with oxygen/air may be used to facilitate substantially complete oxidation of the metal oxide particles. The exiting hydrogen gas is polished (purified) using a sulfur guard bed and/or a membrane separation unit.

In order that the invention may be more readily understood, reference is made to the following example, which is intended to be illustrative of an embodiment of the invention, but is not intended to be limiting in scope.

EXAMPLE

Figure 7:
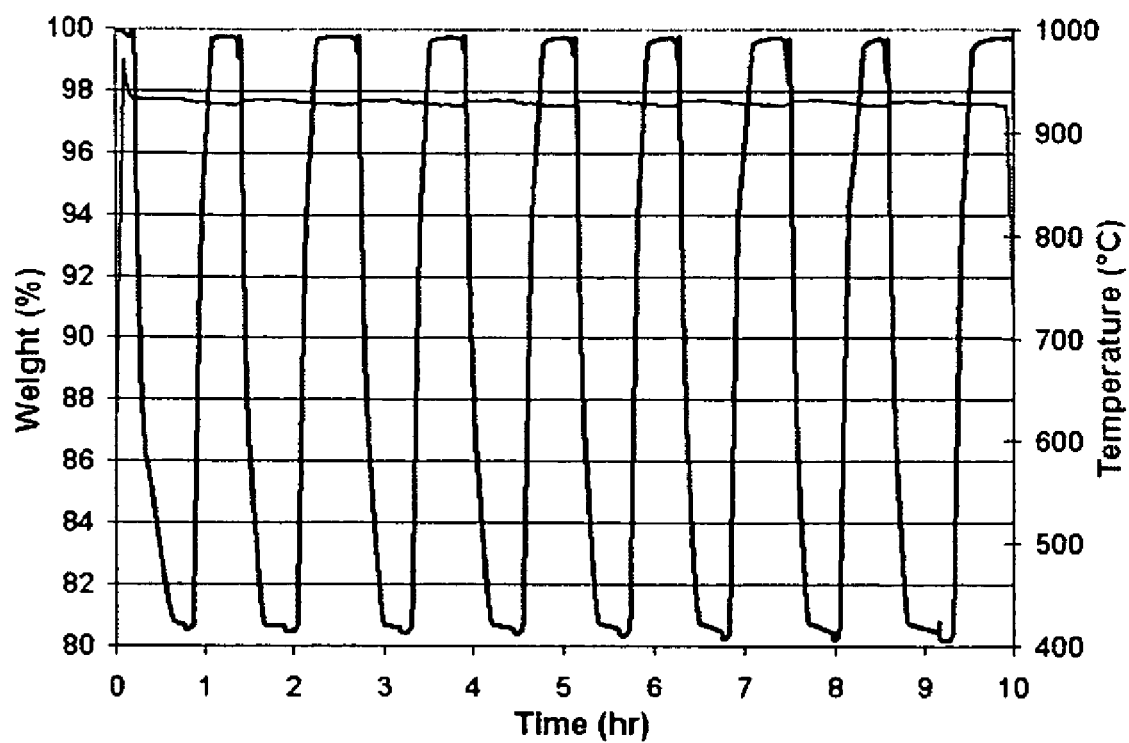
FIG. 7 is a graph illustrating the recyclability of porous metal oxide composite particles in an embodiment of the invention.

A 66.7 wt. % $Fe_2O_3$—$TiO_2$ porous composite particles were tested for cyclic reduction and oxidation. The composite particles were prepared using a modified sol gel technique. Titanium isopropoxide was dissolved in methanol in a beaker and a solution of $FeCl_3.6H_2O$ in methanol was added to it with continuous stirring. An initial gel formed which quickly disappeared. On standing, coupled with slight heating, a translucent gel was formed. The gel was dried for 24 hours in a vacuum at 60° C. and calcined at 500° C. for 2 hours in air to form the composite particles. The particles showed no drop in activity and oxygen carrying capacity over 8 cycles of reduction with $H_2$ and oxidation with air, as can be seen from FIG. 7

It will be apparent to those skilled in the art that various changes may be made without departing from the scope of the invention which is not considered limited to the specific embodiments described in the specification and drawings, but is only limited by the scope of the appended claims.

What is claimed is:

1. A method for producing a hydrogen gas stream and a separate sequestrable $CO_2$ stream from a carbonaceous fuel and steam comprising the steps of:

reducing a $Fe_2O_3$ containing particle by reacting said particle with a carbonaceous fuel in a first reaction zone comprising a moving packed bed reactor, a countercurrent rotary kiln, a series of interconnected fluidized bed reactors, or a series of interlinked monolithic bed structures by flowing said particle countercurrently to the flow of a gaseous phase generated by said carbonaceous fuel to form a metallic iron containing particle, the reducing reaction also directly producing a sequestrable stream of $CO_2$ and $H_2O$ rich gas comprising at least 90 mol % of $CO_2$ and steam combined;

oxidizing the metallic iron containing particle with steam in a second reaction zone comprising a moving packed bed reactor, a countercurrent rotary kiln, a series of interconnected fluidized bed reactors, or a series of interlinked monolithic bed structures by flowing said metallic iron containing particle countercurrently to said steam in said second reaction zone producing an iron oxide containing particle, wherein the iron has a higher oxidation state, the oxidation reaction also producing a $H_2$ rich gas stream;

oxidizing the iron oxide containing particle obtained from the oxidation reaction in said second reaction zone with an oxygen containing gas in a third reaction zone to produce a $Fe_2O_3$ containing particle; and returning the $Fe_2O_3$ containing particle to said first reaction zone.

2. A method as claimed in claim 1 in which $H_2O$ is condensed and removed from said sequestrable stream of $CO_2$ and $H_2O$ rich gas.

3. A method as claimed in claim 1 further comprising recycling of at least a portion of said sequestrable $CO_2$ and $H_2O$ rich gas to said first reaction zone.

4. A method as claimed in claim 1 where the iron phase in said particle after said oxidation reaction comprises $Fe_3O_4$.

5. A method as claimed in claim 1 where the iron phase in said particle obtained in said third reaction zone comprises $Fe_2O_3$.

6. A method as claimed in claim 1 where said carbonaceous fuel comprises syngas, carbon monoxide, methane rich gas, light hydrocarbons, and mixture thereof.

7. A method as claimed in claim 1 where said particle further includes copper oxide or nickel oxide.

8. A method for producing a hydrogen gas stream and a separate sequestrable $CO_2$ stream from a carbonaceous fuel and steam comprising the steps of:

reducing a $Fe_2O_3$ containing particle by reacting said particle with a solid or a liquid carbonaceous fuel in a first reaction zone, in which said first reaction zone is divided into a first stage and a second stage, and wherein said carbonaceous fuel is introduced between the two stages, flowing said particle countercurrently to the flow of a gaseous phase, leading to the formation of a metallic iron containing particle, the reducing reaction also directly producing a sequestrable stream of $CO_2$ and $H_2O$ rich gas;

oxidizing the metallic iron containing particle with steam in a second reaction zone by flowing said metallic iron containing particle countercurrently to said steam in said second reaction zone producing an iron oxide containing particle, wherein the iron has a higher oxidation state, the oxidation reaction also producing a $H_2$ rich gas stream;

oxidizing the iron oxide containing particle obtained from the oxidation reaction in said second reaction zone with an oxygen containing gas in a third reaction zone to produce a $Fe_2O_3$ containing particle; and returning the $Fe_2O_3$ containing particle to said first reaction zone.

9. A method as claimed in claim 8 wherein said solid or liquid carbonaceous fuel is selected from coal, biomass, tar sand, oil shale, petroleum coke, heavy liquid hydrocarbons, wax, and mixtures thereof.

10. A method as claimed in claim 8 in which said first reaction zone comprises a moving packed bed reactor comprising a first stage and a second stage and said carbonaceous fuel is introduced between said first and second stages.

11. A method as claimed in claim 8 further comprising injecting an oxygen containing gas into said first reaction zone.

12. A method as claimed in claim 8 wherein at least a portion of said sequestrable stream of $CO_2$ and steam is recycled to said first reaction zone.

13. A method as claimed in claim 8 wherein at least a portion of CO gas produced in said first stage of said reaction zone is recycled into said second stage.

14. A method as claimed in claim 8 wherein said metallic iron containing particle is separated from the combustion products of said carbonaceous fuel using the magnetic properties of said particle.

15. A method as claimed in claim 1 in which said $Fe_2O_3$ containing particle is in the form of a porous composite.

16. A method as claimed in claim 15 in which said $Fe_2O_3$ containing particle has a size in the range of from about 50 microns to about 50 mm.

17. A method as claimed in claim 15 in which said $Fe_2O_3$ containing particle comprises a mesoporous matrix having pore sizes of from about 20 to about 250 Angstroms.

18. A method as claimed in claim 15 in which said $Fe_2O_3$ containing particle comprises a support material and a promoter.

19. A method as claimed in claim 18 in which said support material comprises a ceramic material selected from at least one of the group consisting of oxides of Al, Ti, Zr, Y, Si, La, Sr, and carbides of Si and Ti.

20. A method as claimed in claim 18 in which said promoter is selected from at least one oxide of Fe, Cu, Ni, Sn, Co, V, Zn, Mo, Pt, Ru, Cr, Mn, and Ca.

21. A method as claimed in claim 8 in which said $Fe_2O_3$ containing particle is in the form of a porous composite.

22. A method as claimed in claim 8 in which said $Fe_2O_3$ containing particle has a size in the range of from about 50 microns to about 50 mm.

23. A method as claimed in claim 8 in which said $Fe_2O_3$ containing particle comprises a mesoporous matrix having pore sizes of from about 20 to about 250 Angstroms.

24. A method as claimed in claim 8 in which said $Fe_2O_3$ containing particle comprises a support material and a promoter.

25. A method as claimed in claim 24 in which said support material comprises a ceramic material selected from at least one of the group consisting of oxides of Al, Ti, Zr, Y, Si, La, Sr, and carbides of Si and Ti.

26. A method as claimed in claim 24 in which said promoter is selected from at least one oxide of Fe, Cu, Ni, Sn, Co, V, Zn, Mo, Pt, Ru, Cr, Mn, and Ca.

* * * * *